F. R. CUNNINGHAM.
POISING CALIPERS.
APPLICATION FILED OCT. 23, 1907.
984,354.
Patented Feb. 14, 1911.
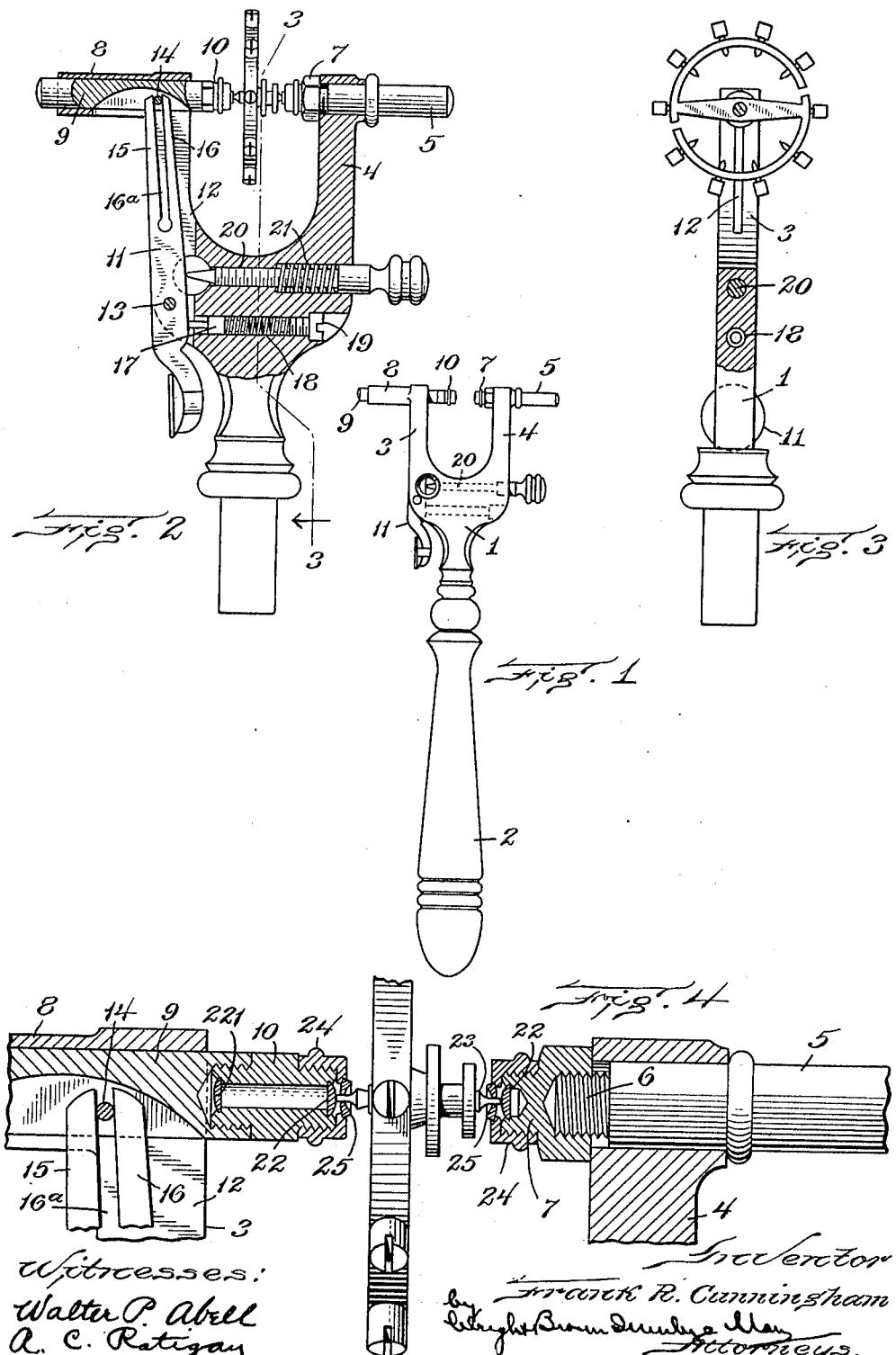

UNITED STATES PATENT OFFICE.

FRANK R. CUNNINGHAM, OF MEDFORD, MASSACHUSETTS, ASSIGNOR TO KENDRICK & DAVIS, OF LEBANON, NEW HAMPSHIRE, A FIRM.

POISING-CALIPERS.

984,354.

Specification of Letters Patent. Patented Feb. 14, 1911.

Application filed October 23, 1907. Serial No. 398,760.

*To all whom it may concern:*

Be it known that I, FRANK R. CUNNINGHAM, of Medford, in the county of Middlesex and State of Massachusetts, have invented certain new and useful Improvements in Poising-Calipers, of which the following is a specification.

The present invention consists in a tool for holding balance wheels of watch or clock movements while being poised.

The objects are to provide a tool of this character permitting more rapid insertion and removal of work than in the poising tools heretofore used, to permit an accurate adjustment of the bearings for the staff of a balance wheel, to hold the same without looseness and also without end pressure, to provide a novel form of jewel bearing for the ends of a staff constructed with two jewels made separable so that they may be cleaned, and to provide other improved details of construction which will be hereinafter more particularly described.

Of the accompanying drawings,—Figure 1 represents an elevation of a tool embodying the principles of my invention. Fig. 2 represents a sectional view of the same on an enlarged scale. Fig. 3 represents a cross-section on line 3—3 of Fig. 2. Fig. 4 represents an enlarged section through the bearings, illustrating in detail the construction thereof.

The same reference characters indicate the same parts in all the figures.

The instrument consists of a frame 1 carried by a handle 2 and having arms 3 and 4. These arms are separated somewhat and are absolutely rigid, having no relative movement of approach or recession whatever. In one of the arms, as 4, is set a pin 5 passing entirely through the arm and having a threaded shank 6 on the inner side of the arm, to which shank is attached a stationary bearing 7. On the other arm is a tubular guide 8 in which is slidably contained a bar 9 carrying a movable bearing 10. The pin 5, bar 9 and bearings are all in line, and the movable bearing reciprocates on this line toward and from the fixed bearing. For so moving the bearing 10, I provide an actuating lever 11 contained in a slot 12 in the arm 3, and pivoted upon a pin 13 in the caliper body at the base of this arm. Connection is made between the lever and slide 9 by means of a pin 14 on the latter, and resilient fingers 15 16 on the end of the lever. These fingers are separated by a slot 16ª which, when the lever is free of the pin, is of less width than the diameter of the latter. Consequently the insertion of the pin into this slot spreads the fingers apart somewhat, causing them to embrace the pin and thus absolutely preventing any lost motion between the lever and slide.

In the base of the caliper frame is formed a passage containing a plunger 17, a spring 18 pressing said plunger outward, and an abutment screw 19. The plunger bears against the lever 11 on the opposite side of its pivot from the slide 9, and so tends to press the slide and the bearing carried thereby toward the fixed bearing 7. Threaded into the caliper frame is a screw 20 which projects toward the lever 11 on the opposite side of the pivot 13 from the spring-pressed plunger. This screw is in the path of the lever and serves as a stop to limit the approach of the movable bearing toward the fixed one. By turning the outer end of the screw, its position can be altered, and the distance between the bearings when brought to rest, adjusted. By means of this adjustment, the bearings can be separated so as to remove all friction-producing pressure from the ends of the staff held between them, and at the same time retain the staff without looseness. A spring 21 bears against the stop screw and holds one side of its threads in engagement with the complemental thread of the socket, wherein it is contained, thereby taking up any looseness which there may be. This stop is designed to limit the approach of the movable bearing 10 toward the fixed one, and to adjust the space between the bearings so exactly that the staff of a wheel may be held between them without friction-causing pressure on its end, and also without too great looseness. The actuating lever causes the movable bearing to be advanced toward and withdrawn from the fixed bearing rapidly so that wheels may be inserted and removed with the greatest convenience, while the adjustable stop serves to fit the bearings for staffs of all sizes. The connection between the lever and slide consisting of the pin 14 in the slot 16ª, allows the slide to move rectilinearly, while the resilience of the spring fingers causes them to bear with the same pressure on each side of the pin and so eliminate lost motion. This result, elimination of looseness, is further forwarded by the spring-pressed plunger 17, which normally presses the bearings together and tends to hold the lever in contact with the stop 20.

One of the important improvements of my invention is the constuction of the bearings. These are provided with jewels against one of which the end of the staff bears, while the other surrounds the staff and holds it against sidewise movement, and are separable so that they may be easily cleaned and polished. The bearing 7 consists of a main holder which has a base in the form of a nut, and is screwed upon the threaded end of the pin 5. In its tip this holder is provided with a socket in which is set an end-thrust bearing jewel 22 which has preferably a plane, or at least unrecessed, surface against which the end of the balance wheel staff 23 is adapted to bear. The holder 7 is threaded externally and receives a screw cap 24 constituting the holder for the second jewel 25 of the bearing. This jewel is annular, having a central hole through which projects the reduced pivot of the staff. The movable bearing 10 is essentially similar, consisting of the main holder to which the numeral 10 is applied, carrying the end bearing jewel 22, and being threaded to receive the cap 24 which holds the annular bearing jewel 25. It differs from the other bearing, however, in this, that the main holder 10 is symmetrical with respect to its ends, being threaded into a socket in the slide 9, and capable of being turned end for end. In its opposite end it carries a jewel 221 similar to the jewel 22, which can be put into use by simply reversing the holder 10 in the socket and applying the cap 24 to the other end. This capability doubles the life of the bearing, permitting replacement of a defaced or unsuitable jewel without necessitating delay for repairs.

In using the instrument for poising a balance wheel, the staff of the latter is first set in the bearings and adjusted so that there will be no end shake or friction. The weights of the screws which are set into the rim of the balance are then varied in the usual way until the center of gravity is exactly in the axis of the staff. In order to determine if the wheel is perfectly poised, it is set into rotation by vibrating the tool through rubbing upon a portion of it, the tool being held against the edge of a bench. The rubbing is done by an instrument which has sufficient friction to set the tool vibrating, thus causing the balance to be rotated. If it is perfectly poised, it will continue rotating as long as the rubbing is kept up, but if not so poised, it will of course come to rest with its heaviest portion downward. It is for the purpose of furnishing a convenient member to take the rubbing without injury to the apparatus as a whole that I provide the detachable projecting pin 5. After considerable use, the part of the apparatus which is rubbed upon will become worn away, and if no provision were made for replacing the worn part, it would become unfit for use. When, however, the pin 5 is worn away, no harm is done, because a new pin can readily be substituted.

I claim:—

1. A poising caliper, comprising a pair of rigid arms, opposed bearings mounted on said arms, one of which bearings is movable in a guide on its respective arm, an actuating lever for the movable bearing having spring fingers, and a pin on said movable bearing grasped between said fingers, whereby the bearing is enabled to move rectilinearly and lost motion is prevented.

2. A poising caliper, comprising a pair of rigid arms, opposed bearings mounted on said arms, one of which bearings is movable in a guide on its respective arm, an actuating lever for the movable bearing pivoted to the body of the caliper, a spring-pressed plunger bearing on said lever on one side of its pivot tending to move it so as to press the movable bearing toward the other, an adjustable stop threaded into the caliper body on the other side of the lever pivot from said spring-pressed plunger so as to limit the approach of the lever and movable bearing toward the other, and a spring arranged to press the threads of said stop in one direction against its complemental engaging threads to take up looseness between them.

3. A poising caliper, including a frame, a socket supported thereby, a reversible holder adapted to have either end detachably inserted and held in said socket, end-thrust bearing jewels set in both ends of said holder, a cap detachably fastened on the outer end of the holder, and an annular lateral-bearing jewel set in said cap.

4. A poising caliper comprising a frame having an intermediate space to receive a balance wheel, a bearing rigidly secured to said frame at one side of said space for one of the pivots of the balance staff, a bearing for the other pivot of said staff mounted at the other side of said space, with provisions for moving toward and from said fixed bearing, a lever pivoted to the frame engaging said movable bearing and having a finger piece by which it may be engaged to retract the bearing, a spring-pressed pin mounted in said frame, and bearing on said lever at one side of the pivot thereof to urge the movable bearing toward the fixed bearing, and an adjustable stop threaded into the frame in the path of said lever on the opposite side of the pivot thereof for limiting the movement of the movable bearing toward the fixed bearing.

5. A poising caliper comprising a frame and separated bearings for the pivots of a balance staff set upon said frame and relatively movable together and apart for admitting and holding such pivots, each bearing including a holder having an end thrust jewel, a ring detachably threaded upon said holder, and an annular lateral bearing jewel secured to said ring approximately coaxially therewith.

In testimony whereof I have affixed my signature, in presence of two witnesses.

FRANK R. CUNNINGHAM.

Witnesses:
   ARTHUR H. BROWN,
   P. W. PEZZETTI.